United States Patent [19]
Barnett et al.

[11] 4,314,682
[45] Feb. 9, 1982

[54] DEPLOYABLE SHIELD

[75] Inventors: Burton Barnett, Rossmore; Martin R. Kinsler, Los Angeles; Lyle A. Nelson, Tarzana, all of Calif.

[73] Assignee: Rockwell International Corporation, El Segundo, Calif.

[21] Appl. No.: 802,306

[22] Filed: Feb. 24, 1969

[51] Int. Cl.³ .......................... B64G 1/22; B64G 1/52
[52] U.S. Cl. ............................... 244/158 R; 244/121; 244/158 A; 343/18 A
[58] Field of Search ............... 244/1 SS, 121, 158 R, 244/158 A, 163; 343/18 A, 18 B, 18 E

[56] References Cited

U.S. PATENT DOCUMENTS

| | | | |
|---|---|---|---|
| 3,197,158 | 7/1965 | Rogallo | 244/1 X |
| 3,349,396 | 10/1967 | Reed | 343/18 |
| 3,349,397 | 10/1967 | Rosenthal | 343/18 |
| 3,427,619 | 2/1969 | Wesch et al. | 343/18 |

FOREIGN PATENT DOCUMENTS

E 9874 12/1956 Fed. Rep. of Germany ........ 343/18
1215786 5/1966 Fed. Rep. of Germany ........ 343/18

Primary Examiner—Charles T. Jordan
Attorney, Agent, or Firm—R. D. Seibel; H. F. Hamann

[57] ABSTRACT

A mechanism is described for deploying a shield from a space vehicle or the like. Such a shield may be employed for minimizing radar echo, for protecting the vehicle from solar radiation, or for providing a bumper for minimizing damage from micrometeoroids. A spring loaded mechanism is provided so that the shield can be folded into a compact package for launch of the space vehicle. The spring loaded mechanism further provides for rapid development of the shield when restraints are released. Arrangements are provided for deploying semi-cylindrical shields and quarter spherical shields.

9 Claims, 14 Drawing Figures

DEPLOYABLE SHIELD

BACKGROUND

In many situations it is desirable to provide a protective shield at least partly surrounding a space vehicle such as a satellite or the like. Thus, for example, it may be desirable to provide a shield of radar attenuator material to minimize the ability of an enemy to detect and track the vehicle by ground based radar. Such a shield also camouflages the characteristic radar and optical signatures of the vehicle. A shield may also be desirable for minimizing the flux of solar radiation on the surface of the vehicle in order to minimize loss of cryogenic propellents or otherwise maintain thermal control of the space vehicle. In other circumstances it may be desirable to deploy a shield around a space vehicle to provide a mechanical bumper to attenuate the energy of micrometeoroids and prevent or reduce mechanical damage to the vehicle surface.

In any of these situations it is desirable to have a small volume and weight package for the shield during launch of the space vehicle for minimizing aerodynamic drag and the consequence heat and aerodynamic loading on the structure. Thus, it is desirable to provide a shield that is stowable in a small volume and readily deployed after the vehicle reaches space.

SUMMARY OF THE INVENTION

Thus in the practice of this invention, according to a preferred embodiment, there is provided a space vehicle with a deployable shield at least partly surrounding the space vehicle. The means for deploying the shield includes a plurality of elongated members extending outwardly from the body of the space vehicle and a plurality of curved ribs having their ends connected to ends of the extending elongated members to define an outside periphery of the shield. A spherical portion of the shield is readily provided by pivoting a plurality of ribs around a common point to form a quarter sphere, for example.

DRAWINGS

Objects and many of the attendant advantages of this invention will be readily appreciated as the same becomes better understood by reference to the following detailed description when considered in connection with the accompanying drawings wherein.

Throughout the drawings like reference numerals refer to like parts.

DESCRIPTION

Although, as pointed out hereinabove, the shield about a space vehicle may serve as a meteoroid bumper or as thermal protection, it will be described hereinafter in relation to a radar attenuating shield. It should be recognized, of course, that a shield having a principal function of radar attenuation also provides a measure of thermal protection and micrometeoroid protection as well.

Electromagnetic waves such as radar may be absorbed by a so-called quarter wave or Salisbury screen which comprises a thin layer of material having an impedance of about 377 ohms per square which is the characteristic impedance of free space spaced exactly one-quarter wavelength from a reflective surface. Such an absorber is described in U.S. Pat. No. 2,599,944. Since an absorber of this type prevents radar reflection by a mechanism of destructive interference at one-quarter wavelength from a reflective surface, it is found to be highly sensitive to frequency and will attenuate radar only within a narrow frequency band. It is found, however, that such an interference absorber also attenuates radiation at odd multiples of one-quarter wavelength.

Further, it is found that a plurality of resistive layers individually spaced from a reflective surface at different distances each attenuate radiation at different wavelengths and a broad band radar attenuator can be achieved. The impedance of these successive layers spaced apart from the reflective surface and the spacing therebetween is governed by interactions between the successive sheets and these sheets may not each be provided with an impedance of 377 ohms per square. In general it is found that the first sheet upon which radar is expected to impinge should have an effective impedance as seen by an incoming radar wave of about 377 ohms per square in order to have minimal reflection therefrom. Successive sheets between the outermost layer and the reflective layer have successively lower effective impedance down to the substantially zero impedance of the reflective layer. The effective impedance of each layer is determined not only by the impedance of that layer but also the impedances of the various underlying layers. The selection of impedances for the various sheets and the spacing therebetween are readily determined for particular frequency ranges of attenuation by one skilled in the art.

It is preferred that the sheets have d.c. resistivities in the range of from about 40 to 2,000 ohms per square to provide effective attenuation in a multilayer broad band radar attenuator. If desired, the layers may have capacitance and inductance at radar frequencies as well as d.c. resistivity for providing greater design flexibility in the radar attenuator. In general, the total thickness of attenuator spaced from the reflective layer is determined by the longest wavelength of radar to be attenuated; this distance approximating one-quarter of the longest wavelength of the radiation. The distance between successive sheets is likewise determined by reference to the shortest wavelength it is desired to attenuate; this distance being approximated by one-quarter of the shortest wavelength.

Previously, interference type attenuators have been formed of carbon loaded fabric sheets spaced apart by non-metallic honeycomb materials or have comprised similar relatively heavy and rigid structures. These absorbers are unduly heavy and bulky for application in most space situations.

A significant problem associated with interference type absorbers is the substantial thickness and concomitant weight that must be employed in a design for attenuation of lower frequency radar. This difficulty is circumvented herein by making the radar attenuator material erectable in space and thereby providing the necessary dimensions without violating limitations on storage space and weight aboard the space vehicle. Also, because the radar attenuator material may be damaged by aerodynamic heating, thermal protection during launch boost is necessary. To keep the weight and launch volume to a minimum it is mandatory that the radar attenuator material be deployed from a compact volume that can be shielded with a relatively small amount of thermal protection material. In some situations it may be desirable to provide a radar attenuator material readily attached to and deployable from an existing design of space vehicle without changing the basic structure thereof.

With these considerations in mind, there is provided a high performance, light weight attenuator that is self-erecting from a compacted configuration and which can meet the variety of constraints imposed by space environments and spacecraft systems. It will again be recognized that a multiple sheet meteoroid-bumper or thermal shield is also advantageous.

Figures 1, 2, 3:
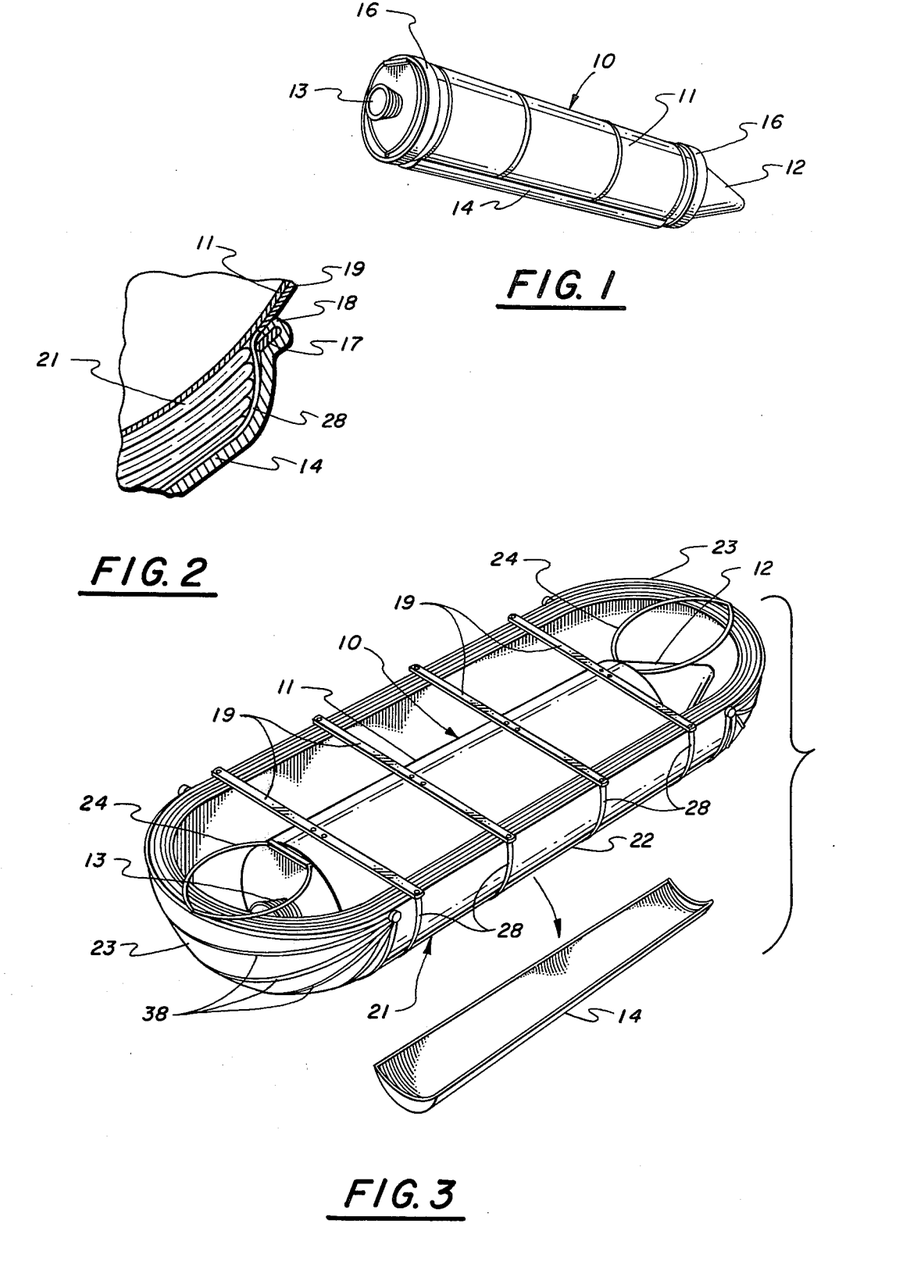
FIG. 1 illustrates in perspective a space vehicle incorporating the principles of this invention.
FIG. 2 illustrates a cross-sectional detail of a shield-containing pod on the space vehicle of FIG. 1.
FIG. 3 illustrates a deployed shield about the space vehicle.

FIG. 1 illustrates, in perspective, a spacecraft or satellite 10 as provided in the practice of this invention according to a preferred embodiment. As illustrated in FIG. 1 the spacecraft has a cylindrical body portion 11 having a conical nose 12. A rocket engine 13 on the aft end of the vehicle may be employed in launching the vehicle into orbit or be employed for orbital changes as is well known in the art.

Along one side of the space vehicle 10, normally the side that would be downward in earth orbit, there is provided a jettisonable pod 14 for containing a cylindrical portion of radar attenuating material for later deployment in space. At the forward and aft ends of the cylindrical portion 11 of the vehicle there is also provided a cylindrical shroud 16 for containing additional radar attenuating material for shielding the ends of the space vehicle as hereinafter described.

FIG. 2 illustrates in greater detail a transverse section of the edge of a typical pod 14. As illustrated therein the edge of the pod 14 is secured to the cylindrical wall 11 of the space vehicle by a locking clip 17 engaging an intermittent lip 18 on the shroud. Retraction of the clip 17 releases the lip and hence the pod 14 which is jettisoned from the space vehicle as urged by flat, cantilever spring members 19 temporarily coiled around the vehicle. Within the pod 14 there is provided a packed radar attenuating shield 21 folded and compressed to occupy a minimized volume. It will be apparent to one skilled in the art that other types of releasing clips, quick disconnects, pyrotechnic devices, or similar separating means can be employed to temporarily hold a pod or shroud on the space vehicle and effect a rapid jettisoning of the pod.

FIG. 3 illustrates the cylindrical portion of the space vehicle 10 ensconsed within the radar attenuator shield 21 after the shield is deployed into its operational shape after the pod 14 is jettisoned. As illustrated in this embodiment, the radar attenuator shield is in the general form of an open shell or bathtub-like structure having a central semi-cylindrical portion 22 having an end cap 23 at each end thereof in the form of one-quarter of a sphere or other surface having compound curvature.

The internal radius of the semi-cylindrical section 22 and end caps 23 is substantially the same as the diameter of the space vehicle 10 so that the space vehicle can be below the edge of the radar attenuating shield 21 and hence shielded from view by the shield over 180° of viewing angle. The position of the space vehicle 10 within the deployed shield 21 is also illustrated in the transverse cross-section of FIG. 4. The relation of shield and vehicle is described in detail and claimed in copending U.S. patent application Ser. No. 802,310 entitled, "Vehicle Shield" by T. H. Lehman and W. P. Manning, filed on the same day as this application and assigned to North American Rockwell Corporation, Assignee of this application. This copending application is hereby incorporated herein by reference to have the full force and effect as if set forth in full herein.

Referring again to FIG. 3 the cylindrical portion 22 of the radar attenuating shield is connected to the space vehicle 10 by the aforementioned flat spring members 19 which have their midpoints secured to the side of the space vehicle. The radar attenuating shield is connected to the ends of the spring members 19. The spherical end caps 23 are secured to the space vehicle in part by loops 24 which are also employed in deploying the end caps as hereinafter described in greater detail.

Figure 4:
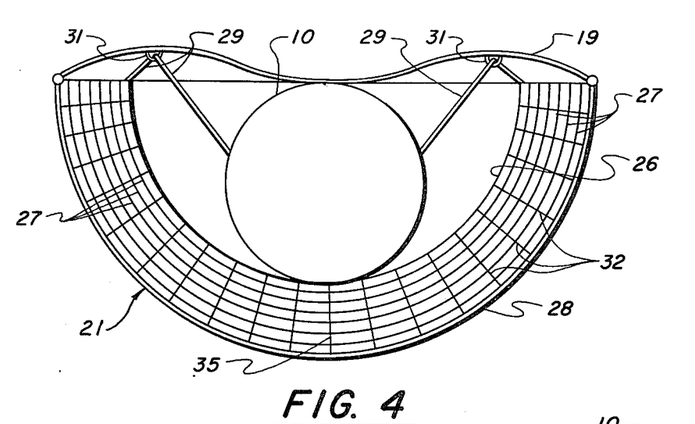
FIG. 4 shows the deployed shield in transverse cross-section.

FIG. 4 illustrates a transverse cross-section of the space vehicle 10 and radar attenuating shield 21 with the vehicle merely shown schematically since its internal structure is not relevant to practice of this invention. As mentioned hereinabove, the transverse spring members 19 are connected at their midpoints to the side of the space vehicle and support the radar attenuator shield at their outer ends. As illustrated in FIG. 4 the spring members are bowed due to pre-bending and to forces applied thereon by the shield, however, the bowing illustrated in FIG. 4 is exaggerated as compared with an actual structure to illustrate the principles of this invention without unduly enlarging the drawings. The bowing in the spring members 19 assures proper location of the radar attenuating shield relative to the space vehicle and also permits the spring members to be wrapped downwardly about the surface of the space vehicle and fit snugly thereagainst at all points without application of undue tension loads on the spring members. When the springs are deployed as illustrated in FIG. 4, they have a minimum stress since this approaches their equilibrium shape. As pointed out hereinafter the springs are under greater stress when stowed for launch.

As described hereinabove the radar attenuating shield comprises an inner reflective layer 26 which may, for example, be a sheet of polyethyleneterephthalate available under the trademark Mylar from E. I. duPont de Nemours and Company, Wilmington, Delaware, or a sheet of cured polyimide resin, either of which is coated with an electrically conductive film of metal such as aluminum. Other reflective films suitable for use in a space environment and having sufficient shape memory not to deform during storage in the stowed arrangement may be employed. Spaced outwardly from the inner conductive sheet 26 are a plurality of attenuating layers 27 which may also comprise sheets of Mylar or the like coated with very thin layers of metal or layers of resistive materials to provide a suitable resistance for forming an effective interference type radar attenuator as pointed out hereinabove. A typical design of radar attenuator of this type and suitable for use in practice of this invention is described in copending U.S. application Ser. No. 670,828, now U.S. Pat. No. 4,044,358 entitled, "Self-Erectable Structure" by William P. Manning and Louis Maus, and assigned to North American Rockwell Corporation, Assignee of this application. This copending application is hereby incorporated herein by reference to have the full force and effect as if set forth in full herein.

At the outer ends of the spring members 19 a rib or stiffener 28 is connected so as to extend in a semi-circular arc around the semi-cylindrical portion of the radar attenuating shield. The rib 28 is made of a plastic material similar to the sheets so that it can be elastically coiled or folded during storage without creeping or otherwise permanently deforming. Thus, upon release of the radar shield from the enclosing structure, the rib 28 elastically springs back to its original semi-circular shape to provide stiffening and shaping for the outer periphery of the radar attenuating shield. If desired, an inflatable rib or the like may be employed for stiffening. A plurality of such ribs (FIG. 3) are spaced along the length of the cylindrical section at each of the spring members 19 for defining the external semi-cylindrical surface of the radar attenuating shield. Thus the external cross-sectional shape of the shield is determined by the ribs 28 and the location of the shield is determined by the spring members 19. The internal shape of the radar attenuating shield, that is, the shape of the innermost sheet 26, is fixed by placing the entire sheet in tension. Tension is applied to the edge of the sheet 26 by a light cable 29 connected at one end to the edge of the sheet and at the other end to the body of the spacecraft 10. The cable 29 passes through an eyelet 31 on the spring member so that tension is applied in the proper direction. Tension is also applied to the sheet by tension members 32 between the rib 28 and the inner sheet 26. These tension members 32 assure that the inner sheet is substantially constant distance from the rib 28 throughout the extent of the radar attenuator. The individual attenuator sheets 27 are also connected to the tension members 32 for maintaining proper spacing therebetween. A tension member 35 at the midpoint of the ribs is also connected to the space vehicle to stabilize the position of the curved rib. It will be apparent that, if desired, additional diagonal tension members may be employed to fix the location of the ribs.

Figure 8:
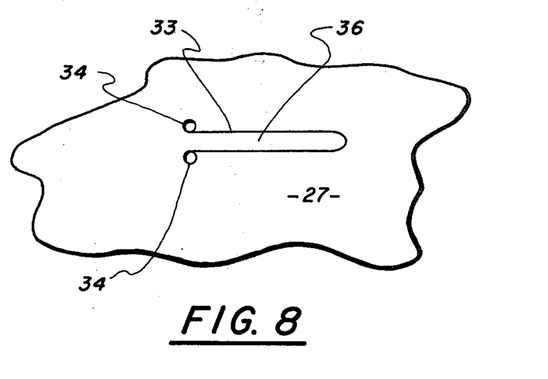
FIG. 8 is a detail view of a tab on a sheet of the shield.
Figure 9:
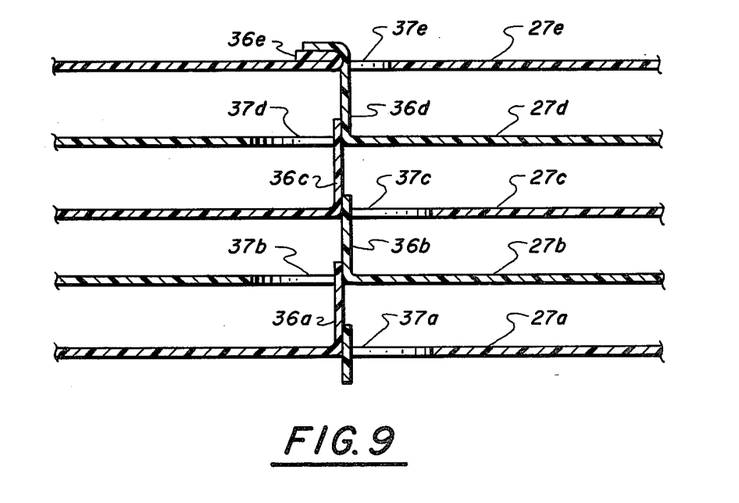
FIG. 9 illustrates a typical tension member between sheets of the shield.

Although the tension members 32 may be light threads or even fine wires, a preferred tension member is formed by a series of tabs from each sheet to the next as illustrated in FIGS. 8 and 9. Thus, as illustrated in FIG. 8, a plurality of elongated U-shaped slits 33 are made in the various attenuator sheets to provide a tab 36 for interconnection with the other attenuator sheets. Holes 34 are provided at the ends of the U-shaped slit to prevent tearing of the plastic of the attenuator sheets. In fabricating a tension member from such tabs 36 a structure as illustrated in FIG. 9 is formed. It should be recognized that the sheets 27 illustrated in FIG. 9 have a greatly exaggerated thickness for purposes of illustration, since the Mylar employed may have a thickness of from one-half to one mil and the spacing between the sheets may be one or two inches.

As illustrated in FIG. 9 a tab 36a is bent up from a typical attenuator sheet 27a and similar tabs 36b through 36d are bent up from typical attenuator sheets 27b through 27d. The end of the tab 36a is cemented to the base of the tab 36b so that the two are substantially parallel in the deployed position and tension loads are readily transferred therebetween. It will also be apparent that the attenuator sheet 27a is thus spaced a fixed distance from the attenuator sheet 27b since the tab 36a limits the extent of separation. It will also be apparent that since the tab 36a is flexible and has virtually no resistance to buckling the two attenuator sheets can be compressed together for storage with no harmful effects. Similarly, the bent up tab 36b is secured to a bent up tab 36c on typical attenuator sheet 27c. This same assembly technique continues to the outermost sheet 27e in the assemblage. A tab 36e on the outermost attenuator sheet is bent over and cemented to the face of the attenuator sheet 27e and the tab 36d on attenuator sheet 27d is cemented to the bent over tab 36e. It will be seen that each of the several attenuator sheets are thus spaced apart when the tabs 36 are in tension and the entire assemblage may be readily collapsed for storage.

When the tabs 36 are bent up from the attenuator sheets 27, narrow slots 37 are left in the attenuator sheets and these slots are preferably staggered in successive sheets so that there is no direct through aperture in the radar attenuator. Measurement shows that such staggered slots in an attenuator sheet assemblage do not have a serious effect on the radar cross-section reduction.

Figure 5A:
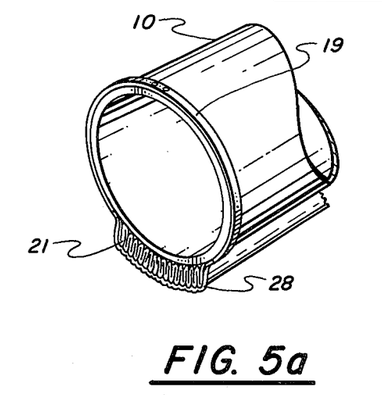
FIGS. 5a to 5c illustrate a portion of the shield in various stages of deployment.
Figure 5B:
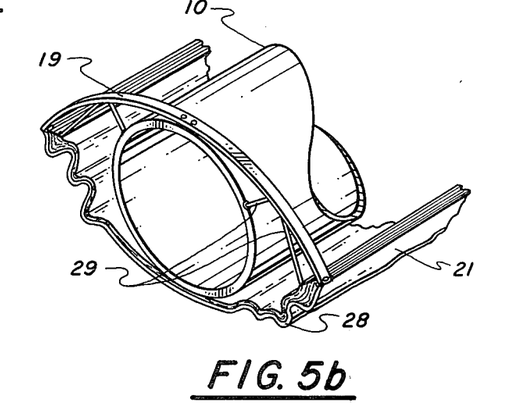
Figure 5C:
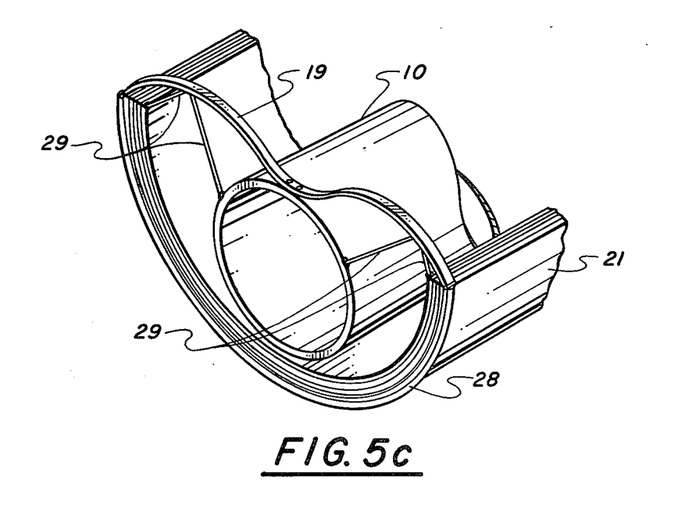

Deployment of the radar attenuating shield about the cylindrical portion of the space vehicle is illustrated in FIGS. 5a through 5c showing successive steps in the deployment sequence. As illustrated in FIG. 5a the attenuator shield 21 is folded within the stowage pod which is not illustrated in FIG. 5a for greater clarity. The spring members 19 are wrapped downwardly around the circumference of the space vehicle so that the ends are held in place by the pod as hereinabove described in relation to FIG. 2. After the pod is removed the spring members 19 rapidly straighten out as illustrated in FIG. 5b which shows an intermediate stage of deployment before the springs are completely straightened and the radar attenuating shield fully deployed. As the springs 19 straighten, the cable 29, which is substantially taut throughout deployment, slides through the eyelet 31 and assists in drawing the shield upwardly and outwardly towards its final configuration. In the view of FIG. 5c the spring member 19 is extended to its final position supporting the ends of the rib 28 which determines the external shape of the radar attenuating shield. As mentioned hereinabove the cable 29 supports the innermost sheet of the shield and the entire assemblage is held in its final deployed shape as hereinabove described. Because of the light weight of the sheets forming the attenuator and the absence of air resistance in space, the entire deployment may occur in a matter of seconds, even on fairly large structures.

Figure 6A:
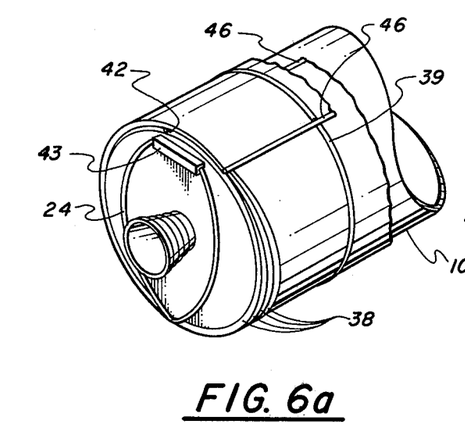
FIG. 6a through 6c illustrates various stages of deployment of an end of the shield.
Figure 6B:
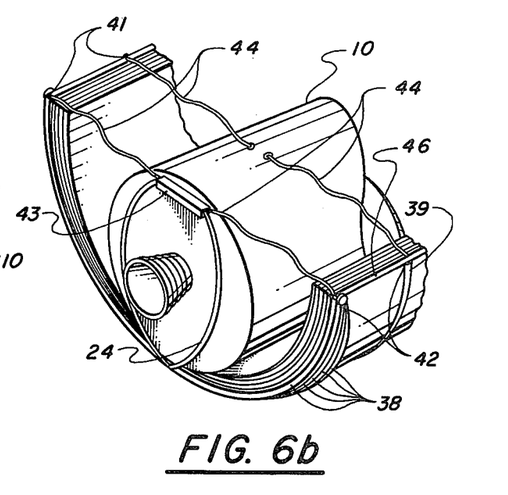
Figure 6C:
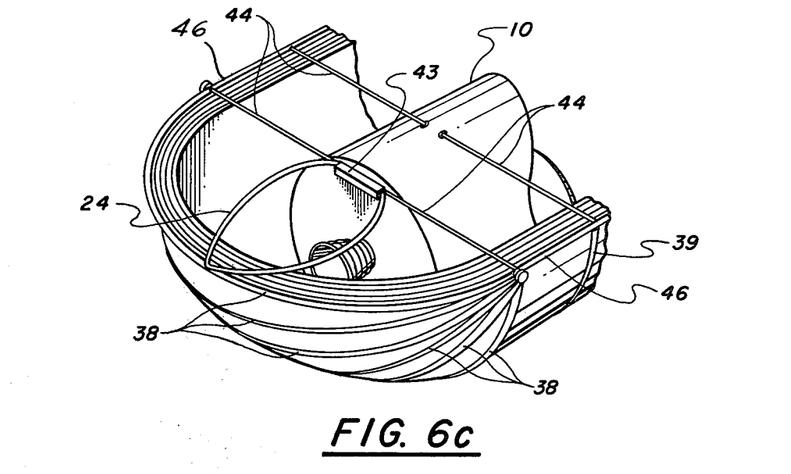

FIGS. 6a through 6c illustrate deployment of an end cap of the shield at the end of the vehicle 10 where the rocket engine 13 extends. These figures also illustrate a second embodiment of deployment for a shield surrounding the cylindrical portion of a vehicle. As illustrated in this embodiment a plurality of semi-circular ribs 38 are pivotably interconnected at their ends so as to be pivotable between a first position with the ribs in a tight closed bundle (FIG. 6b) and a second position with the center points of the ribs mutually spaced apart (FIG. 6c). This type of motion is similar to that employed on the sunshade of some models of baby buggy.

When the shield is compacted for storage or launch the ribs 38 and a similar rib 39 on the cylindrical portion of the spacecraft are wrapped upwardly around the spacecraft as illustrated in FIG. 6a. Since the extent of the ribs is somewhat greater than the circumference of the vehicle, one end 41 of the ribs is overlapped over the opposite end 42 of the ribs. The edges of the shield supported by the ribs 38 are also overlapped in the same manner. During storage the loop 24 is pivoted downwardly about its support 43 so as to lie parallel to the end of the space vehicle 10. The loop 24 is provided as an interconnection between the vehicle and the uppermost rib of the end cap so as to clear the rocket engine 13 during deployment.

The first step in deployment of a shield as illustrated in this embodiment, is to jettison a shroud (not shown) whereupon the ribs 38 and 39, which are elastically bent around the vehicle, spring outwardly as illustrated in FIG. 6b. Cables 44 are provided between the upper side portion of the spacecraft and the ends 41 and 42 of the ribs to limit the extent of unfolding and to hold the shield in its proper shape and position after deployment. The cylindrical portion of the shield is further held in position and in a proper shape by a rib 46 running along the length of the vehicle at the edge of the shield and interconnecting the ends of the ribs 39 with the ends of the ribs 38. It will also be apparent that additional diagonal tension members may be provided between the vehicle and selected points on the shield for holding these two elements in fixed spatial relation.

The quarter spherical shape of the end cap 23 is provided by pivoting the loop 24 about its support 43 either in response to a conventional torsion spring or by other means such as small motor (not shown) within the support 43. As the loop pivots outwardly and upwardly it draws the first rib 38 to which it is connected, away from the bundle of ribs as seen in FIG. 6b, and when the sheet 27 between the first rib and the second rib on the end cap is substantially taut, the next rib is moved out from the bundle. This proceeds, mutually spreading the ribs 38 apart, until a substantially spherical or other compound curved surface is obtained as illustrated in FIG. 6c.

It should be recognized that when the loop 24 is pivoted to its deployed position as seen in FIG. 6c by a torsion spring, the action may commence at substantially the same time as the release of the ribs and the loop may have pivoted out of the position parallel to the end of the vehicle as seen in FIG. 6b before the ends of the ribs are fully extended. This effect is not illustrated in FIG. 6 in order to avoid any possible confusion therefrom. It will also be recognized, of course, that a delayed release of a spring loaded loop may be provided or in those circumstances where the loop is motorized for deployment, the loop may well pivot sequentially after the ends of the ribs are stabilized. Although a spring loaded loop deployment is preferred for lightness of weight, a motorized deployment loop may be desirable in some circumstances since the motor may be operated in either direction so that the loop is again swung into a position substantially as shown in FIG. 6b collapsing the end cap. This is advantageous in those situations where the rocket motor 13 is to be employed for space maneuvering since the end cap is thus cleared of any possible interference with the rocket motor exhaust.

The shield arrangement hereinabove described can also be considered as a skeletal frame about the space vehicle with the flexible sheets forming the shield secured thereto. Thus the ribs 28 and 38, the springs 19, and loops 24 form a springy or elastically deformable skeletal frame. This frame is stable in a deployed configuration as illustrated in FIG. 3 with the ribs spaced from the space vehicle and only the mid portions of the springs and a side of the loop fixedly attached to the vehicle. This frame is deformable under stress to the stowed position for launch and spontaneously deploys when the containing pod is jettisoned. The flexible sheets of the radar attenuator are attached to the frame and fold or deploy therewith to partly surround the space vehicle.

Figure 7A:
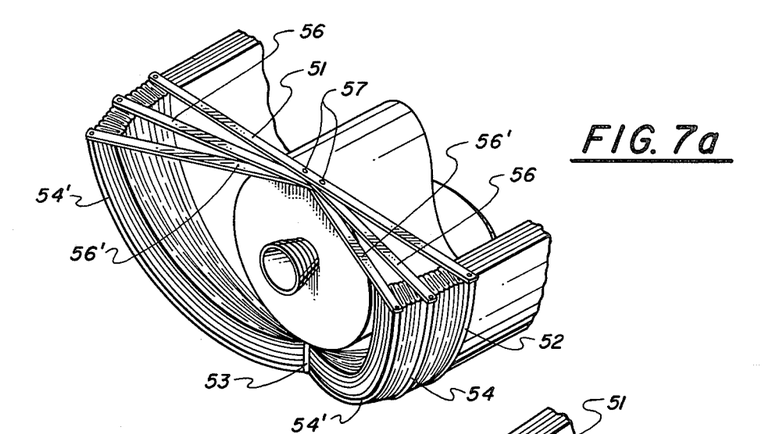
FIGS. 7a and 7b illustrate an alternative arrangement for deployment of an end of the shield.
Figure 7B:
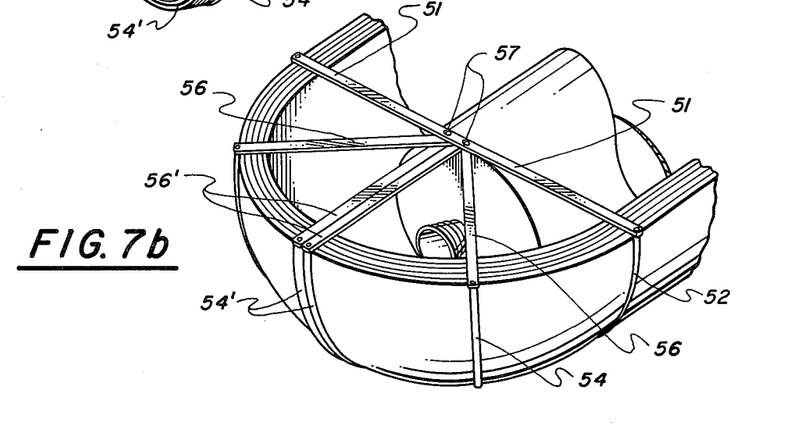

FIGS. 7a and 7b illustrate an alternative deployment technique for the end caps on a shield for a space vehicle. In this embodiment the shield is folded downwardly beneath the vehicle and is contained in a pod (not shown) in substantially the same manner as the cylindrical shield hereinabove described and illustrated in FIG. 5. As is apparent, the first stage of deployment of such a shield is substantially the same as hereinabove described and is not again illustrated.

In this embodiment the quarter spherical end cap is made of two segments each deployed from one side of the vehicle. A spring member 51 transverse to the vehicle axis is at the end of the cylindrical section of the shield for providing support in substantially the same manner as the spring member 19 illustrated in the first embodiment. The spring member 51 has a semi-circular rib 52 connected at the ends thereof and the rib 52 extends around the shield to define its circular cross-section. In addition, a rigid post 53 is connected to the space vehicle 10 on the side opposite from the point where the spring 51 is connected. The center portion of the rib 52 is connected to the post 53 for stabilization. It will be apparent that the post 53 can be an elastic member collapsed for stowage or a small rigid member deployed by a spring or motor when released. Each of additional quarter circular ribs 54 have an end pivoted at the post 53 and have the opposite end connected to flat spring members 56. The springs 56, in turn, have their opposite ends connected to the space vehicle 10 at pivot points 57 so that they can be moved in a manner similar to a common folding fan.

In the intermediate stage of deployment, which is not separately illustrated herein, the ribs and spring members are in a close bundle somewhat resembling the configuration illustrated hereinabove in FIG. 5c. After the springs and ribs are in their final shape they are pivoted to form the final shape of the shield. Thus, as illustrated in FIG. 7a the ribs 56 are pivoted about the pivot points 57 and the ribs 54 are pivoted about the post 53 so that the shield is unfolded from a compact bundle as driven by a small motor (not shown) with the outer ends of the springs progressively diverging during deployment. Deployment continues in this manner until the outermost pair of springs 56' and 54' meet in a plane along the axis of the vehicle as illustrated in FIG. 7b. In this position the springs support the upper edge of the shield and the ribs define its external geometry in the form of a quarter of a sphere or other desired surface having compound curvature. It will be apparent that in the embodiment illustrated in FIGS. 7a and 7b, only a pair of springs 56 and ribs 54 are shown in each half of the quarter sphere. However, in order to obtain a closer approximation of a spherical surface a larger number of ribs and springs may be employed if desired.

It will be apparent also that many other modifications and variations can be made in the practice of this invention. Thus, for example, instead of a spherical end cap as has been described and illustrated, the shape of the ribs can be varied so that an ellipsoid or other compound curved figure can be provided.

We claim:

1. A combination comprising:
   a space vehicle, and
   a deployable shield at least partly surrounding said space vehicle, said shield comprising:
   a plurality of curved ribs collectively defining an outside periphery of said shield, said ribs being temporarily deformable from a first deployed position spaced apart from said space vehicle to a second stowed position adjacent said space vehicle;
   a plurality of flexible sheets connected to said ribs and spaced between said ribs and said space vehicle;
   a plurality of springs tangentially mounted on said space vehicle and having an end of a rib connected to an end of each spring, said springs being temporarily elastically deformable from a first deployed position extending outwardly from said space vehicle to a second stowed position lying along a cylindrical surface of said space vehicle, said springs being pivotally connected to said space vehicle at a common pivot for deploying in the manner of a folding fan;
   the ribs connected to said portion of springs having ends opposite to the ends connected to said springs pivotally mounted at a common pivot for deploying with said springs to form a surface having compound curvature;
   a plurality of arcuate ribs interconnected at each end at a pair of common pivots, said arcuate ribs being elastically deformable from a stowed position adjacent the space vehicle to an intermediate position spaced apart from the space vehicle in a compact bundle, and pivotable from the intermediate position to a deployed position with the ends of the ribs contiguous at the pivots and the midpoints of the ribs mutually spaced apart for defining an outside periphery having compound curvature; and
   a loop connected to said space vehicle and to an intermediate portion of one of said ribs, said loop being movable for pivoting said one rib from the intermediate position to the deployed position.

2. A combination comprising:
   a space vehicle; and
   a deployable shield partly surrounding said space vehicle,
   said shield comprising:
   a plurality of curved ribs collectively defining an outside periphery of said shield, said ribs being temporarily deformable from a first deployed position spaced apart from said space vehicle to a second stowed position adjacent said space vehicle,
   a plurality of flexible sheets connected to said ribs and spaced between said ribs and said space vehicle,
   a tension member between each end of each of said ribs and the space vehicle,
   a substantially rigid interconnection between the ends of adjacent ribs,
   a substantially rigid interconnection between the space vehicle and an intermediate portion of at least one of said ribs,
   at least a portion of said ribs are interconnected at their ends at a pair of common pivots for motion between an intermediate position in a compact bundle and a deployed position with the ends of the ribs contiguous and intermediate parts of the ribs mutually spaced apart for defining an outside periphery having compound curvature,
   the common pivots for the portion of ribs being in substantially the same plane as the ends of other ribs not connected to the pivots,
   one of the ribs connected to the common pivots being in the same plane as the ends of other ribs in the deployed position with rib midpoints spaced apart, and wherein,
   said rigid interconnection between the space vehicle and the intermediate portion of a rib comprising a loop connected to the motion thereof between a stowed position adjacent the space vehicle and a deployed position extending from the space vehicle.

3. A combination comprising:
   a space vehicle, and
   a deployable shield at least partly surrounding said space vehicle, said shield comprising:
   a plurality of elongated members extending outwardly from the body of the space vehicle,
   a plurality of curved ribs having ends connected to ends of said extending members, said ribs defining an outside periphery of the shield, and
   a plurality of flexible sheets in spaced apart relation between said ribs and said space vehicle,
   said elongated members being elastically deformable between a stowed position along the surface of the space vehicle and a deployed position extending outwardly therefrom, and
   said ribs being elastically deformable between a stowed position adjacent the body of the vehicle and a deployed position extending at least partly around the vehicle,
   means for restraining said elongated members in the stowed position,
   a second plurality of curved ribs each having one end connected at the first common pivot and a second end connected at a second common pivot, said second plurality of ribs being elastically deformable between a stowed position adjacent the body of the vehicle and an intermediate position wherein the ribs are in close bundle; and are pivotably movable about said common pivots between the intermediate position and a deployed position wherein the ribs define sectors of a surface having compound curvature, and
   means for pivoting said ribs between the intermediate position and the deployed position.

4. The combination as defined in claim 3 wherein said ribs collectively define a semi-cylindrical outside periphery of said shield.

5. A combination as defined in claim 3 wherein said ribs collectively define an outside periphery of said shield in the form of a sector of a sphere.

6. A combination comprising:
   a space vehicle having a generally cylindrical body portion;
   a plurality of spring members connected along the cylindrical body portion and substantially tangent thereto, said spring members in a deployed position extending outwardly from the vehicle and being elastically deformable to a stowed position lying around the cylindrical surface;
   a plurality of arcuate ribs having ends connected to said spring members, said ribs collectively defining a semi-cylindrical surface outwardly of the cylindrical body portion said ribs being elastically deformable to a collapsed position adjacent the space vehicle;

a flexible sheet between the surface defined by said ribs and said cylindrical body portion;

a first plurality of tension interconnections between edges of said sheet and said spring members; and a second plurality of tension interconnections between said ribs and said sheet, said first and second tension interconnections cooperating to hold said sheet in an approximately semi-cylindrical shape.

7. A combination as defined in claim 6 further comprising:

a plurality of flexible sheets spaced apart between the aforementioned flexible sheet and the surface defined by said ribs; and wherein said first tension interconnections each comprise:

a light cable having a first end connected to said space vehicle, a second end connected to an edge of said sheet, and an intermediate portion slidably connected to one of said spring members at a point between the ends thereof; and said second tension interconnections each comprise:

a plurality of flexible segments, each segment interconnecting a pair of said flexible sheets for maintaining said sheets in predetermined spaced apart relation in the deployed position.

8. A combination as defined in claim 7 wherein each of the flexible segments comprises a narrow tab cut on three sides from one of said sheets and bent outwardly therefrom, and connected to a similar tab on an adjacent sheet.

9. In combination with a space vehicle, a deployable shield comprising:

an elastic skeletal frame comprised of:
 (a) a plurality of spring members attached to a side of the vehicle and movable between;
  (1) a deployed position lying substantially tangent to the side of the vehicle, and
  (2) a stowed position wrapped around a periphery of the vehicle;
 (b) a first and second plurality of rib members, said first plurality comprised of arcuate rib members, each of said arcuate members attached to an end of a spring member, said second plurality comprised of a number of second rib members, each of said second rib members having its respective ends connected to each of a pair of common pivot points for movement between a first position wherein the second rib members are in a closed bundle and a second position wherein the second rib members have ends connected and their respective midpoints spaced apart; and a flexible shield member secured to the frame and movable therewith between stowed and deployed positions, said shield member, in deployed position, extending substantially about at least one side of the vehicle.

* * * * *